United States Patent Office 3,380,953
Patented Apr. 30, 1968

3,380,953
PROCESS FOR PREPARING DISPERSIONS OF LOW DENIER FIBERS
Osamu Fukushima, Kurashiki, Japan, assignor to Kurashiki Rayon Company Limited, Kurashiki, Japan, a corporation of Japan
No Drawing. Filed July 6, 1964, Ser. No. 380,647
Claims priority, application Japan, July 15, 1963, 38/38,395
6 Claims. (Cl. 260—34.2)

ABSTRACT OF THE DISCLOSURE

A process for the preparation of a dispersion of 0.1 to 1.0 denier fibers useful in the preparation of synthetic leathers, comprising introducing mixed fiber cut into short lengths and spun from at least two polymeric substances having different solubilities into a liquid which is a selective solvent for one of the polymeric substances thereof and a non-solvent for the others, the cut mixed fiber being at least 60% comprised of polymeric substances soluble in the said liquid, whereby there is effected a dispersion of 0.1 to 1.0 denier insoluble fibers in the said liquid, which liquid additionally contains the soluble portions of the said cut mixed fiber in solution. Also, the product of such process.

This invention relates to a method of manufacturing synthetic leathers and similar shaped articles characterized in that a mixed fiber consisting of two or more kinds of high molecular substances is cut to a suitable length, and the cut fibers are dissolved in a solvent which can dissolve one of the high molecular weight substances but which is a non-solvent for the other high molecular weight substances, and the solution of high molecular weight substances is shaped to an article having a definite thickness.

Heretofore synthetic leathers have often been manufactured by applying various solutions consisting of a single synthetic fiber or various high molecular weight substances dissolved in a solvent onto a sheet of woven cloth or non-woven cloth and then eliminating the solvent by a dry process or a wet process. In such former processes, the part of synthetic products thus manufactured which is composed of a single high molecular weight substance is not sufficiently strong against mechanical stresses and against scratching. There is, however, a limit in fineness of fibers in mixing various synthetic fibers of different compositions, and hence it was very difficult and expensive to produce synthetic fibers having fineness of 0.5 denier or less.

The inventor has discovered a novel method of producing special high molecular weight solution for manufacturing synthetic leather by a process entirely different from heretofore known methods. That is, according to the invention use is made of a special high molecular weight solution of the mixed fiber consisting of two or more kinds of high molecular weight substances having different solubilities to a definite solvent, which mixed fiber being dissolved in a solvent capable of dissolving one of said high molecular weight substances in said mixed fiber. The high molecular weight solution obtained by the method of the invention contains an innumerable number of very thin (fineness 0.1–1 denier) and short fibers and the synthetic leathers manufactured by means of high molecular weight solution of the invention contain innumerable very thin and short fibers so that they have structure quite close to that of natural leathers. Particularly, the outer surface of the synthetic leather prepared with the composition of this invention has an appearance very similar to that of the grain side of natural leather and is extremely strong.

The invention will now be explained in detail referring to an experimental example.

A certain quantity of mixed fiber (2.5 deniers) consisting of 75 parts of 6-nylon and 25 parts of polypropylene was cut into 3–4 mm. in length, and then the cut fibers were immersed into a solvent of 30 parts of calcium chloride in 100 parts of methanol so that the concentration of 6-nylon in the solution may become 7.5%, and further the solution was stirred for 4 hours at 50° C. to dissolve the fibers. In said solution, 6-nylon fibers were almost completely dissolved while the polypropylene fibers of said mixture were dispersed as very thin fibers.

Said solution of the invention can be processed alone, or by adding and partially dissolving high molecular weight materials, salts or solvents prior to processing, or by applying, spraying or sprinkling the solution on a base cloth. Said base cloth being manufactured by using as raw material mixed fibers consisting of two or more kinds of high molecular weight substances having different solubilities and treating the same with a solvent for one of said high molecular materials and subjecting the resultant product to wet heating or dry heating. The base cloth may be either woven or non-woven or may comprise a cloth made of a single kind of natural or synthetic fiber.

As to the mixture ratio of two or more kinds of high molecular weight substances having different solubilities to a solvent for manufacturing mixed fibers according to the invention, it is preferable to use a mixed fiber containing at least 60% of high molecular weight substance in said mixed fiber which is soluble in said solvent. At less than 60%, no variation in sectional area was produced and merely hollow yarns were produced, which are not suitable for the purpose of the invention.

As the high molecular weight substances to be used as raw materials for the mixed fiber of the invention, various high molecular weight substances capable of producing mixed fiber by melt spinning, dry spinning or wet spinning, such as polyamide, modified polyamide, copolymerized polyamide, polyester, modified polyester, copolymerized polyester, polyurea, polyurethane, elastic high molecular weight substances of polyurethane having urethane bonds, polyacrylonitrile, polyolefin, polystyrene, polyvinyl acrylate, polyvinyl alcohol, polyvinyl formal, polyvinyl chloride, etc. can be used.

The invention will now be explained referring to examples.

Example 1

The mixed fiber (fineness 2 deniers) consisting of 80 parts of methoxymethylated nylon and 20 parts of polyethylene was cut into 3 mm. lengths and mixed and dissolved in a solution of 30 parts of calcium chloride in 100 parts of methanol or in a solution of 25 parts of sodium nitrate in 100 parts of methanol to result in 10% concentration. The resulting solution stirred the mixed fiber solution for 5 hours at 50° C. The solution contained only extremely thin (fineness 0.1–0.8 denier) polyethylene fibers dispersed therein.

Example 2

The mixed fiber (fineness 1.5 deniers) consisting of 75 parts of polyacrylonitrile and elastic high molecular weight substances of polyurethane having urethane bonds (trade name, Texine) was cut into 2.5 mm. in length, then it was mixed and dissolved in a solution of rhodan salt to result in 10% concentration, and then stirred for 5 hours at 80° C. to dissolve the acrylonitrile component completely.

The solution according to the invention thus obtained contained only extremely thin (fineness 0.1–0.5 denier) fibers of Texine component dispersed therein.

Example 3

A special solution of high molecular weight substances manufactured by said Example 1 was applied on the surface (grain side) of a base cloth with a uniform thickness the beginning of a parenthesis said cloth being manufactured by crimping a mixed fiber (fineness 3 deniers) consisting of 45 parts of 6-nylon and 55 parts of polypropylene at a rate of 10 crimps per inch, cutting it into 3.5 cm. lengths, manufacturing a random web, shaping a three-dimensional original cloth by punching said web, applying 15–20% of emulsion of polymethylacrylate on said original cloth, drying said emulsion, permeating a solution containing 60 parts of methanol, 30 parts of calcium chloride and 40 parts of water, eliminating said solution gradually by dry process, spraying again a solution of 40 parts of calcium chloride in 100 parts of methanol on the surface of original cloth, and drying said solution the end of a parenthesis then said solution on said base cloth was gradually dried to eliminate solvent and was washed thoroughly with water and dried.

After being dried, an aqueous emulsion of polymethyl acrylate containing a pigment was sprayed on the synthetic leather made according to the invention with a spray gun and the coated leather was dried and finished by spraying lacquer thereon.

The structure, nature and appearance of a synthetic leather according to the invention thus manufactured were very similar to that of a natural leather.

Example 4

An original cloth was manufactured from a mixed fiber (fineness 6 deniers) consisting of 60 parts of polyvinyl chloride and 40 parts of polyacrylonitrile by the same manner as Example 3, and a base cloth was manufactured from said original cloth using, as a solvent for one of said mixed fibers, a solution consisting of 40 parts of rhodankali salt (potassium thiocyanate) in 100 parts of water, then the special solution of high molecular weight substance manufactured by the method of Example 2 was applied on the surface of said base cloth with a uniform thickness. Then said special solution on said base cloth was dried, washed with water and dried again.

The synthetic leather thus obtained had excellent characteristics.

What I claim is:

1. A process for the preparation of a dispersion of 0.1 to 1.0 denier fibers, comprising introducing mixed fiber cut into short lengths, said mixed fiber being individually spun from a mixture of at least two different polymeric substances, into a liquid which is a selective solvent for and capable of dissolving at least one of the polymeric substances thereof but a non-solvent for and incapable of dissolving at least one of the other polymeric substances, the cut mixed fiber being at least 60% comprised of polymeric substances soluble in the said liquid, whereby there is effected a dispersion of 0.1 to 1.0 denier insoluble fibers in the said liquid, which liquid thence additionally contains the soluble portions of the said cut mixed fiber in solution.

2. The process as defined by claim 1, wherein the cut mixed fiber is composed of nylon-6 and polypropylene, the nylon-6 being soluble in the said liquid and the polypropylene being insoluble therein.

3. The process as defined by claim 1, wherein the cut mixed fiber is composed of methoxymethylated nylon and polyethylene the methoxymethylated nylon being soluble in the said liquid and the polyethylene being insoluble therein.

4. The process as defined by claim 1, wherein the cut mixed fiber is composed of polyacrylonitrile and polyurethane, the polyacrylonitrile being soluble in the said liquid and the polyurethane being insoluble therein.

5. The process as defined by claim 1, wherein the cut mixed fiber is composed of polyvinyl chloride and polyacrylonitrile, the polyvinyl chloride being soluble in the said liquid and the polyvinyl chloride being insoluble therein.

6. A dispersion prepared by the process of claim 1.

References Cited

UNITED STATES PATENTS

| | | | |
|---|---|---|---|
| 2,852,424 | 9/1958 | Reinhart et al. | 264—137 |
| 3,010,858 | 11/1961 | Sexsmith | 264—123 |
| 3,312,755 | 4/1967 | Cappucio et al. | 260—857 |

ALLAN LIEBERMAN, *Primary Examiner.*